(12) United States Patent
Ihle

(10) Patent No.: US 6,393,715 B1
(45) Date of Patent: May 28, 2002

(54) LOG LENGTH MEASURING DEVICE

(76) Inventor: Emil Ihle, 27 Lockwood Pl., Clifton, NJ (US) 07012

( * ) Notice: Subject to any disclaimer, the term of this patent is extended or adjusted under 35 U.S.C. 154(b) by 0 days.

(21) Appl. No.: 09/480,528

(22) Filed: Jan. 7, 2000

(51) Int. Cl.[7] .............................. G01B 3/30; G01B 5/14
(52) U.S. Cl. ........................................ 33/669; 33/613
(58) Field of Search ......................... 33/1 F, 27.03, 33/27.031, 27.032, 809, 810, 811, 812, 613, 666, 669, 677, 679.1, 562, 574, 464

(56) References Cited

U.S. PATENT DOCUMENTS

| | | | | |
|---|---|---|---|---|
| 695,661 A | * | 3/1902 | Theibault | 33/810 |
| 1,564,721 A | * | 12/1925 | Tallon | 33/669 |
| 3,015,889 A | * | 1/1962 | Godman | 33/666 |
| 3,183,598 A | | 5/1965 | Parr | |
| 3,197,874 A | * | 8/1965 | Fox | 33/666 |
| 4,233,739 A | | 11/1980 | Hinrichs | |
| 4,386,466 A | * | 6/1983 | Lee | 33/809 |
| 4,527,337 A | * | 7/1985 | Dreiling | 33/613 |
| 4,527,338 A | * | 7/1985 | Dickinson et al. | 33/809 |
| 4,685,215 A | | 8/1987 | Wood et al. | |
| 5,205,045 A | | 4/1993 | Liu | |
| D376,988 S | | 12/1996 | Bruno | |
| 5,809,660 A | | 9/1998 | Bitterlich et al. | |
| 5,862,601 A | * | 1/1999 | O'Brien | 33/42 |
| 6,018,880 A | * | 2/2000 | Wiggins | 33/474 |

* cited by examiner

Primary Examiner—Christopher W. Fulton

(57) ABSTRACT

A log length measuring device for marking uniform lengths in logs. The log length measuring device includes an adjustable length arm. The arm is a telescoping arm. The arm has first portion and a second portion. A pair of marking members marks a log. Each of the marking members is coupled to one of an end of the arm. Each of the marking members comprises a block. Each of the blocks has a front surface, a first end and a second end. The first and second ends are opposing ends. Each of the first edges forms a pointed edge.

1 Claim, 2 Drawing Sheets

LOG LENGTH MEASURING DEVICE

BACKGROUND OF THE INVENTION

1. Field of the Invention

The present invention relates to measuring devices and more particularly pertains to a new log length measuring device for marking uniform lengths in logs.

2. Description of the Prior Art

The use of measuring devices is known in the prior art. More specifically, measuring devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,809,660; 4,233,739; U.S. Des. Patent No. 376,988; U.S. Pat. Nos. 5,205,045; 3,183,598; and 4,685,215.

While these devices fulfill their respective, particular objectives and requirements, the aforementioned patents do not disclose a new log length measuring device. The inventive device includes an adjustable length arm. The arm is a telescoping arm. The arm has first portion and a second portion. A pair of marking members marks a log. Each of the marking members is coupled to one of an end of the arm. Each of the marking members comprises a block. Each of the blocks has a front surface, a first end and a second end. The first and second ends are opposing ends. Each of the first edges forms a pointed edge.

In these respects, the log length measuring device according to the present invention substantially departs from the conventional concepts and designs of the prior art, and in so doing provides an apparatus primarily developed for the purpose of marking uniform lengths in logs.

SUMMARY OF THE INVENTION

In view of the foregoing disadvantages inherent in the known types of measuring devices now present in the prior art, the present invention provides a new log length measuring device construction wherein the same can be utilized for marking uniform lengths in logs.

The general purpose of the present invention, which will be described subsequently in greater detail, is to provide a new log length measuring device apparatus and method which has many of the advantages of the measuring devices mentioned heretofore and many novel features that result in a new log length measuring device which is not anticipated, rendered obvious, suggested, or even implied by any of the prior art measuring devices, either alone or in any combination thereof.

To attain this, the present invention generally comprises an adjustable length arm. The arm is a telescoping arm. The arm has first portion and a second portion. A pair of marking members marks a log. Each of the marking members is coupled to one of an end of the arm. Each of the marking members comprises a block. Each of the blocks has a front surface, a first end and a second end. The first and second ends are opposing ends. Each of the first edges forms a pointed edge.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new log length measuring device apparatus and method which has many of the advantages of the measuring devices mentioned heretofore and many novel features that result in a new log length measuring device which is not anticipated, rendered obvious, suggested, or even implied by any of the prior art measuring devices, either alone or in any combination thereof.

It is another object of the present invention to provide a new log length measuring device which may be easily and efficiently manufactured and marketed.

It is a further object of the present invention to provide a new log length measuring device which is of a durable and reliable construction.

An even further object of the present invention is to provide a new log length measuring device which is susceptible of a low cost of manufacture with regard to both materials and labor, and which accordingly is then susceptible of low prices of sale to the consuming public, thereby making such log length measuring device economically available to the buying public.

Still yet another object of the present invention is to provide a new log length measuring device which provides in the apparatuses and methods of the prior art some of the advantages thereof, while simultaneously overcoming some of the disadvantages normally associated therewith.

Still another object of the present invention is to provide a new log length measuring device for marking uniform lengths in logs.

Yet another object of the present invention is to provide a new log length measuring device which includes an adjustable length arm. The arm is a telescoping arm. The arm has first portion and a second portion. A pair of marking members marks a log. Each of the marking members is coupled to one of an end of the arm. Each of the marking members comprises a block. Each of the blocks has a front surface, a first end and a second end. The first and second ends are opposing ends. Each of the first edges forms a pointed edge.

Still yet another object of the present invention is to provide a new log length measuring device that has a handle for easy grip of the arm.

Even still another object of the present invention is to provide a new log length measuring device that may be expanded or retracted for marking lengths of log to suit the needs of the user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
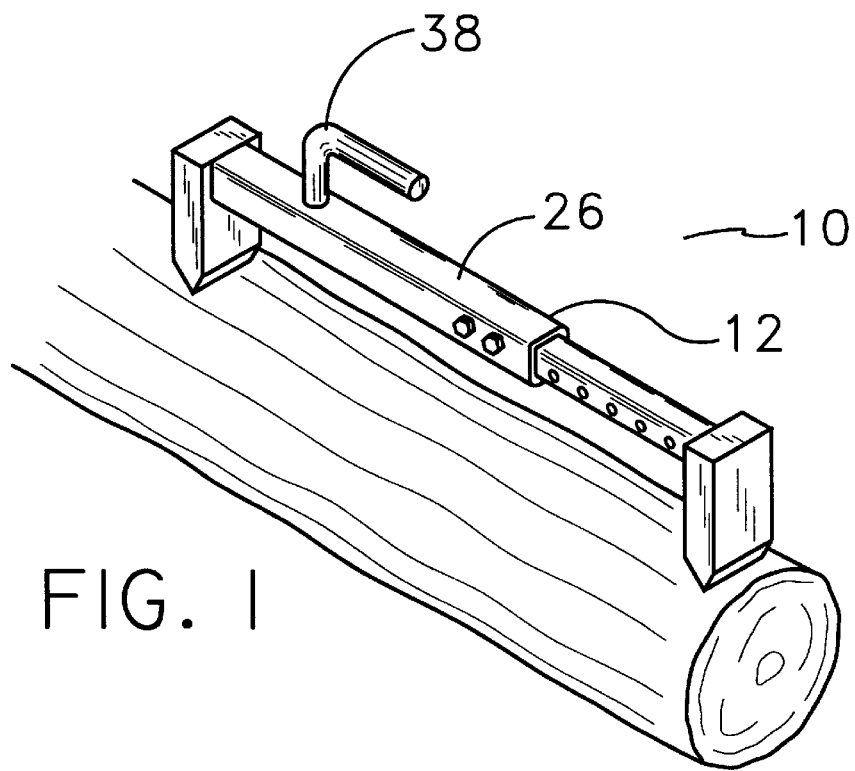
FIG. 1 is a schematic perspective view of a new log length measuring device according to the present invention.
Figure 2:
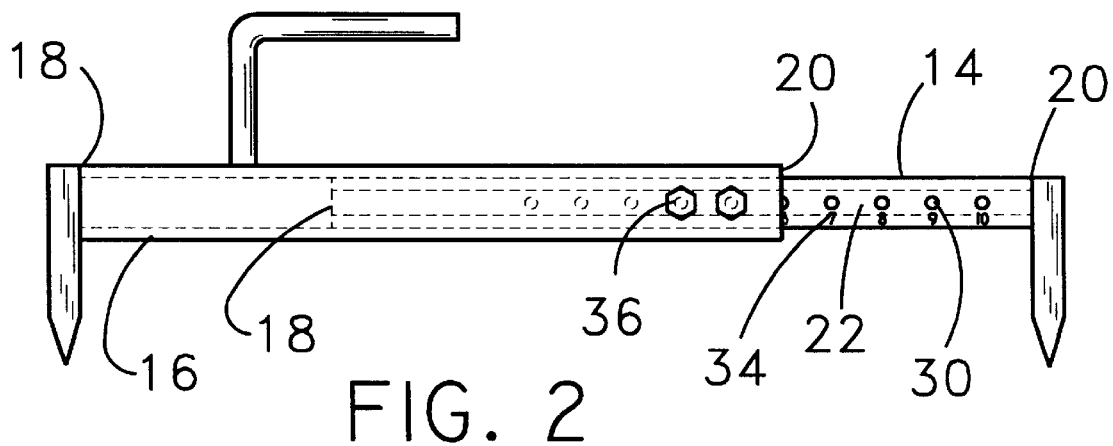
FIG. 2 is a schematic side view of the present invention.
Figure 3:
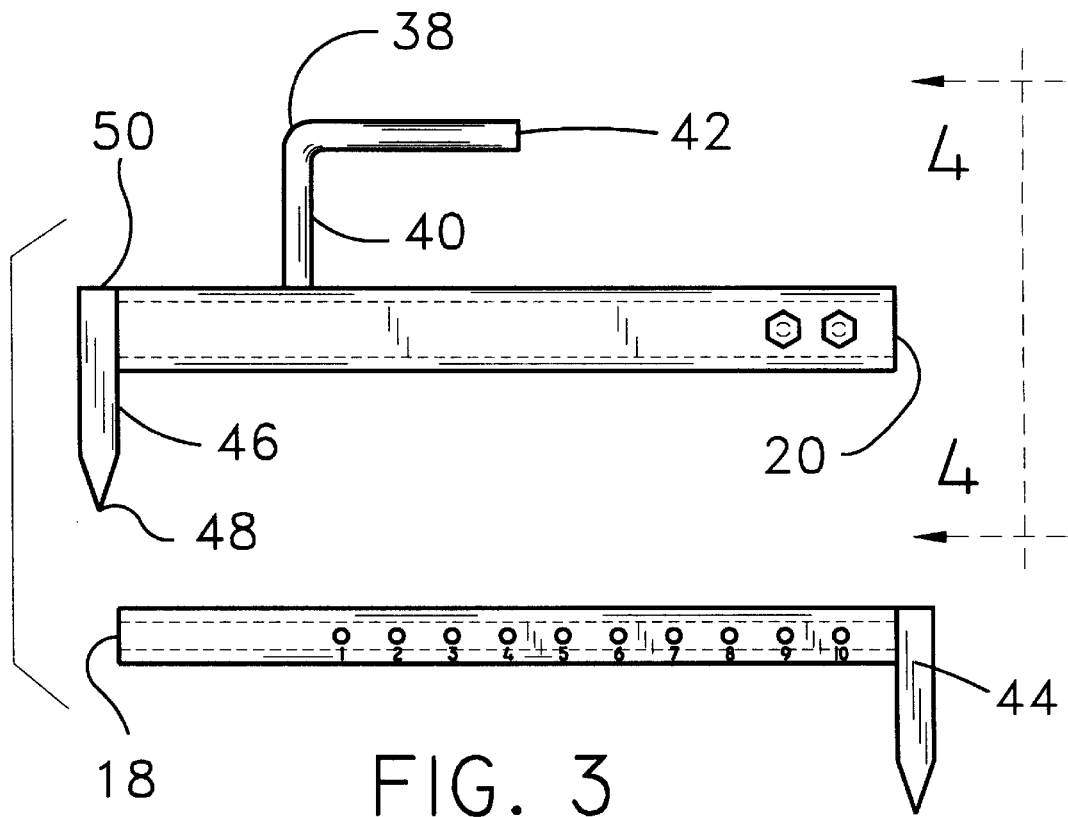
FIG. 3 is a schematic side view of the present invention.
Figure 4:
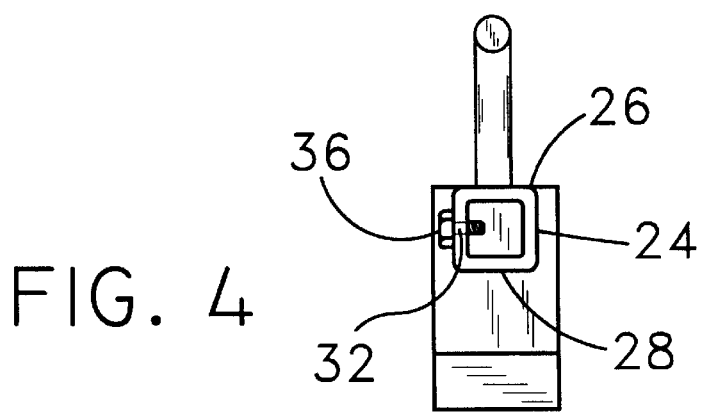
FIG. 4 is a schematic end view taken along line 4—4 of the present invention.

With reference now to the drawings, and in particular to FIGS. 1 through 4 thereof, a new log length measuring device embodying the principles and concepts of the present invention and generally designated by the reference numeral 10 will be described.

As best illustrated in FIGS. 1 through 4, the log length measuring device 10 generally comprises an adjustable length arm 12. The arm is a telescoping arm. The arm has first portion 14 and a second portion 16. The first 14 and second 16 portions each have a first end 18 and a second end 20. The first end 18 of the first arm 14 is slidably received in the second end 20 of the second arm 16. The arm 12 has a generally rectangular shaped cross-section. The arm is elongate and has a first through a fourth side. The first 22 and second 24 sides are opposing sides, and the third 26 and fourth 28 sides are opposing sides. Ideally, the arm 12 has a retracted length approximately equal to fourteen inches, and the arm 12 has an extended length no greater than approximately twenty-four inches. Preferably, the arm 12 has a height substantially equal to one inch.

A plurality of bores 30 is in the first portion 14 of the arm. The bores 30 are located along a length of the first side 22 of the first portion of the arm.

A pair of bores 32 is in the second portion 16 of the arm. Each of the bores is located generally adjacent to the second end 20 of the second portion 16. Each of the bores 32 in the second arm 16 is axially alignable with one of the bores 30 in the first portion 14 of the arm 12 by longitudinal sliding of the first portion with respect to the second portion.

A plurality of number indicia 34 determines a selected length. Each of the number indicia 34 is generally adjacent to one of the bores 30 in the first portion of the arm. The numbers are representative of length selections and may or may not have a corresponding English or Metric Unit calibration.

A pair of securing means 36 selectively secures the first portion 14 in an extended position with the second portion 16. Each of the securing means 36 is removably extendable through one of the bores 32 in the second portion and the first portion 30. Each of the securing means 36 is a bolt.

A gripping means 38 for grasping the arm 12 is an upstanding member having a first end 40 and a second end 42. The upstanding member 38 has an L-shape. The first end 40 of the upstanding member is fixedly coupled to the third wall 26 of the second portion 16. The second end 42 of the upstanding member extends toward the second end 20 of the first portion 16. The gripping means is a handle.

A pair of marking members 44 marks the log. Each of the marking members is coupled to one of the ends of the arm 12. Each of the marking members 44 comprises a block having a front surface 46, a first end 48 and a second end 50. The first 48 and second 50 ends are opposing ends. Each of the first side 48 forms a pointed edge. A front surface 46 of a first of the blocks is fixedly coupled to the first end 18 of the second portion 16. A front surface 46 of a second of the blocks is fixedly coupled to the second end 20 of the first portion 14. The pointed edges extend away from the third side 26 of the arm 12.

In use, a length between the markers 44 is chosen as being favorable for log length. The arm 12 is placed over the log with the edges 48 of the marking members 44 on the log. The second sides 50 of the marking members 44 are hit with a hammer or mallet to make a mark in the log. The log is then cut on the marks.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A length measuring device comprising:

an adjustable length arm, said arm being a telescoping arm, said arm having first portion and a second portion, said first and second portions each having a first end and a second end, said first end of said first arm being slidably received in said second end of said second arm; and a pair of marking members, each of said marking members being coupled to one of said ends of the arm, each of the marking members comprising a block, each of said blocks having a front surface, a first end and a second end, said first and second ends being opposite ends, each of said first ends forming a pointed edge;

a gripping means for grasping by the hand of a user, said gripping means comprising an upstanding member being fixedly coupled to said arm; and said upstanding member of said gripping means having first and second ends, said upstanding member having an L-shape, said first end of said upstanding member being fixedly coupled to said second portion, said second end of said upstanding member extending toward said second end of said first portion;

a securing assembly for releasably securing a position of said portions of said arm with respect to each other, said securing assembly comprising:

a plurality of bores formed in said first portion of said arm, said bores being located along a length of said first portion of said arm; and at least one securing bore formed in said second portion of said arm in a manner such that said securing bore is selectively axially alignable with one of said plurality of bores in said first portion of said arm; and at least one fastener removably mounted on said securing bore and being selectively extendable through one of said plurality of bores in said second portion for selectively fixing a distance between said marking members;

wherein said arm has a generally rectangular shaped cross-section, said arm being elongate, said arm having a first through a fourth side, said first and second sides being opposing sides, said third and fourth sides being opposing sides;

wherein said arm has a retracted length approximately equal to fourteen inches, said arm having an extended length no greater than approximately twenty-four inches;

wherein a pair of said securing bores is formed in said second portion of said arm, each of said bores being located generally adjacent to said second end of said second portion;

a plurality of number indicia for indicating a selected distance between said marking members, each of said number indicia being located generally adjacent to one of said bores in said first portion of said arm.

* * * * *